United States Patent Office 2,731,383
Patented Jan. 17, 1956

2,731,383
SUBSTITUTED UREA-AMIDE COMPLEX

Robert C. O'Neill, New York, N. Y., and Arthur J. Basso, Colonia, N. J., assignors to Merck & Co., Inc., Rahway, N. J., a corporation of New Jersey No Drawing. Application February 11, 1955, Serial No. 487,721

18 Claims. (Cl. 167—53.1)

This invention relates to novel amide-substituted urea complexes and to the processes for preparing these novel compounds.

This application is a continuation-in-part of our copending application Serial No. 422,668, filed April 12, 1954, now abandoned.

It has been found that these amide-substituted urea complexes possess marked and effective action in the control and treatment of the disease coccidiosis which infects poultry.

The novel amide-substituted urea complexes with which this invention is concerned may be represented by the following structural formula:

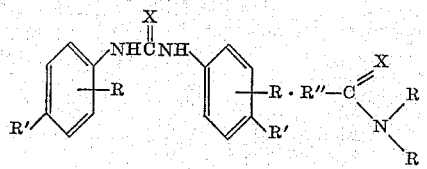

wherein R is hydrogen or a lower alkyl group, R' is an electron withdrawing group, R" is hydrogen or an alkyl or aryl radical containing less than eight carbon atoms and X is oxygen or sulfur.

These amide-substituted urea complexes are new chemical compounds. They are equimolar complexes which have their own characteristic properties that are markedly different from the component parts and are not mere mixtures of a substituted urea and an amide or thioamide.

These novel amide-substituted urea complexes are produced by reacting a substituted urea compound represented by the formula—

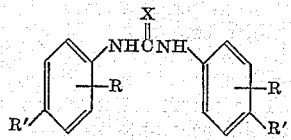

wherein R is hydrogen or a lower alkyl group and R' is an electron withdrawing group and X is oxygen or sulfur, with an amide compound represented by the formula—

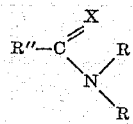

wherein R and X are as defined above and R" is hydrogen, or an alkyl or aryl radical containing less than eight carbon atoms.

In discussing the present invention, for purposes of convenience, the term "amide" has been used as inclusive of thioamides, substituted amides and thioamides.

The substituted urea compounds which may be employed as one of the starting materials in this process are carbonilide compounds having an electron withdrawing group in either or both of the 4 and 4'-positions of the rings. Examples of electron withdrawing groups which may be used are nitro, cyano, carboxy, carboalkoxy, acetyl, trimethyl ammonium, sulfonic acid and carbamide groups. Such groups are alternatively referred to as meta directing (see Fieser & Fieser, "Organic Chemistry," 2d edition, 1950, page 595). Specific carbanilide compounds which may be employed include 4,4'-dinitrocarbanilide; 2 - methyl - 4,4' - dinitrocarbanilide; 4 - nitro - 4' - cyanocarbanilide; and 4-nitro-4'-acetocarbanilide.

The amide compounds which may be employed in this invention include formamide, dimethylformamide, dimethylacetamide, dimethylthioacetamide, dimethylbenzamide and the like.

In accordance with one procedure for carrying out the process of this invention, the solid substituted urea compound is reacted with a solution of the amide compound. The reaction mixture in which the substituted urea compound is ordinarily insoluble or very slightly soluble is stirred until the insoluble complex is formed. The insoluble amide-substituted urea complex may then be filtered, washed and dried.

In those cases where the amide compound is a liquid under reaction conditions an excess of the amide itself may be used as the solvent.

The reaction solvent is not critical. Ethers such as dioxane and ethyl ether, alcohols such as the lower aliphatic alcohols, hydrocarbons such as benzene, toluene, water and mixtures of such solvents may be employed satisfactorily. It has been found advantageous to employ a solvent in which the amide is soluble and in which the substituted urea is insoluble.

Alternately, para - nitrophenylisocyanate may be treated with water in the presence of the amide. The 4,4'-dinitrocarbanilide thus formed reacts with the amide to form the amide-4,4'-dinitrocarbanilide complex.

As the substituted urea compound it is preferred to employ 4,4'-dinitrocarbanilide, although, other carbanilides having different electron withdrawing groups in the 4 and 4'-positions may be used. Typical substituents which may be present in these positions are nitro, cyano, carboxy and carboalkoxyl radicals. Furthermore, the electron withdrawing groups of the 4 and 4'-positions need not be the same. Thus typical examples of 4,4'-disubstituted carbanilides useful in this invention are 4,4'-dinitrocarbanilide; 4,4'-dicyanocarbanilide; and 4-nitro-4'-cyanocarbanilide.

The amide-substituted urea complexes prepared in accordance with this invention are active against the widespread poultry disease commonly called "Coccidiosis" which is caused by species of protozoan parasites of the genus Eimeria. In this regard, E. tenella is responsible for a severe and frequently fatal infection of the cecum of chickens. Furthermore, other serious infections are caused in fowl by other species of Eimeria and especially E. acervulina, E. necatrix, E. maxima, and E. brunetti. If left untreated, such infections often cause extensive losses of fowl. The elimination or control of coccidiosis is, therefore, of the utmost importance for successful poultry raising.

According to a further embodiment of this invention, novel compositions useful in the treatment of coccidiosis are provided containing an amide-substituted urea complex as an active ingredient. These compositions comprise an amide-substituted urea complex intimately combined with an inert carrier. In this regard compositions which contain a compound of the formula—

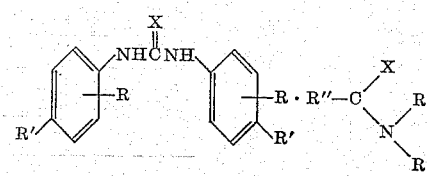

wherein R is hydrogen or lower alkyl groups, R' is an electron withdrawing group, R" is hydrogen or an alkyl or aryl radical containing less than eight carbon atoms, and X is oxygen or sulfur, as the active ingredient has been found to be particularly useful against coccidiosis.

These compositions comprise at least one of the amide-substituted urea complexes mentioned above combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, attapulgus clay and edible vegetable materials such as commercial animal and poultry feeds, urea, corn meal, ground corn, citrus meal, fermentation residues and distillers dried grains. The active ingredient is conveniently dispersed in a solid carrier by conventional methods such as stirring, tumbling, and grinding. In this manner, by selecting different carriers and by altering the ratio of carrier to active ingredient, compositions of varying concentration can be prepared. Compositions very suitable for addition to poultry feed may contain from about 5% to about 40% of the new coccidiostat, and preferably about 10–25%, adsorbed on or mixed with a carrier.

Premixes of 4,4'-dinitrocarbanilide·dimethylformamide complex may be prepared as referred to above in a general manner. Two satisfactory formulations are described in detail below.

A. Ingredients:
 a. 4,4'-dinitrocarbanilide·dimethylformamide complex
 b. Corn distillers dried grains
 c. Wheat shorts
 d. Dried vitamin $B_{12}$ fermentation solubles Composition.—Each pound of the mixture preparation contains 0.30 pound of coccidiostat drug. In order to prepare 1000 pounds of feed premix the following quantities are employed:

a. 300 pounds 4,4'-dinitrocarbanilide·dimethylformamide complex
b. 175 pounds corn distillers dried grains (through 30 mesh screen)
c. 455 pounds wheat shorts (30–80 mesh)
d. 70 pounds dried vitamin $B_{12}$ fermentation solubles (30–80 mesh)

The total amounts of wheat shorts and fermentation solids, and about 150 pounds of corn grains are mixed followed by the drug and the remainder of the corn grains. After mixing for about two hours the material is ready for packaging.

B. Ingredients:
 a. 4,4'-dinitrocarbanilide·dimethylformamide
 b. Corn distillers dried grains
 c. Wheat shorts
 d. Dried vitamin $B_{12}$ fermentation solubles Composition.—Each pound of the mixture contains 0.25 pound of coccidiostat.

Preparation.—The following quantities are employed in order to make 995 pounds of product:

a. 250 pounds 4,4'-dinitrocarbanilide·dimethylformamide
b. 188 pounds corn distillers dried grains (through 30 mesh screen)
c. 487 pounds wheat shorts (30–80 mesh)
d. 70 pounds dried vitamin $B_{12}$ fermentation solubles (30–80 mesh)

Products such as the above are suitable for incorporation into poultry feedstuffs in order to obtain the desired dosage level of active drug.

The amount of active ingredient required for effective prophylactic control of coccidiosis is very low. With regard to poultry, good results have been obtained by the administration of a quantity of the active ingredient equal to about .005% to .05% of the food consumed. Optimum results are usually obtained by the daily administration of a quantity of active ingredient equal to about .0075% to about .025% of the food consumed. Such relatively small amounts may be conveniently incorporated in the normal ration prior to feeding the poultry. Larger concentrations of up to about 0.1% of the active ingredient may be employed therapeutically if an outbreak of the disease is encountered.

The coccidiostatic activity of compositions containing various amide-substituted urea complexes was experimentally demonstrated according to the following test:

Groups of 10 two-week old chicks were fed a mash feed containing from 0.01% to 0.04% of the active ingredient uniformally dispersed therein. After existing on the diet for 24 hours, each chick was inoculated with 50,000 sporulated oocysts of E. tenella. In addition, groups of 10 chicks were also infected but fed a diet free of the active ingredient and used as positive controls. Still other groups were treated separately with the substituted urea compound and the amide compound and with physical mixtures of the substituted urea compound and the amide compound. The experiment was terminated after administering the respective diets for seven days after inoculation and the following results were obtained. The oocyst count (number of parasites of E. tenella remaining) was determined by sacrificing the birds and examining the infected organs microscopically.

TABLE I.—ANTICOCCIDIAL TESTING RESULTS

| Compound | Percent Compound In Diet | Percent Mortality | | Oocyst Count $\times 10^6$ | | Percent Weight Gain | |
|---|---|---|---|---|---|---|---|
| | | Treated | Untreated | Treated | Untreated | Treated | Untreated |
| 4,4'-dinitrocarbanilide | 0.1 | 0 | 40 | 20 | 34 | 60 | 45 |
| | 0.05 | 0 | 40 | 28 | 34 | 66 | 45 |
| | 0.025 | 20 | 40 | 29 | 34 | 54 | 45 |
| 4,4'-dinitrocarbanilide-formamide complex | 0.1 | 0 | 30 | 0.2 | 25 | 81 | 25 |
| | 0.05 | 0 | 30 | 1.0 | 25 | 72 | 25 |
| 4,4'-dinitrocarbanilide-dimethyl formamide complex | 0.1 | 0 | 40 | 0.4 | 18 | 66 | 35 |
| | 0.05 | 0 | 30 | 1.6 | 18 | 73 | 44 |
| | 0.1 | 0 | 5 | 0.1 | 28 | 46 | 31 |
| | 0.05 | 0 | 5 | 1 | 28 | 47 | 31 |
| 4,4'-dinitrocarbanilide-dimethyl acetamide complex | 0.06 | 0 | 33 | 1 | 23 | 32 | 21 |
| | 0.1 | 0 | 47 | 0.1 | 20 | 24 | 9 |

It will be noted from Table 1 that 4,4′-dinitrocarbanilide when administered separately does have activity, but such activity does not approach that displayed by the complex. The complexing agents of themselves are inactive.

The following examples are intended to be illustrative only and may be varied or modified without departing from the spirit and scope of this invention.

*Example 1*

4,4′-DINITROCARBANILIDE-FORMAMIDE COMPLEX

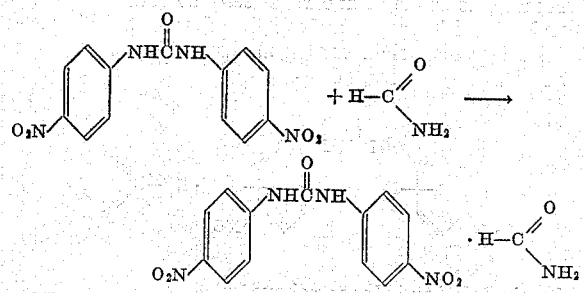

Nine grams of 4,4′-dinitrocarbanilide was stirred with 50 ml. of formamide at steam bath temperature for four hours. The resulting 4,4′-dinitrocarbanilide·formamide complex was filtered, washed with ethyl alcohol and ethyl ether and air dried. This product had a melting point of 262° C. (sealed tube) and weighed 9.78 grams.

*Example 2*

4,4′-DINITROCARBANILIDE-DIMETHYLFORMAMIDE COMPLEX

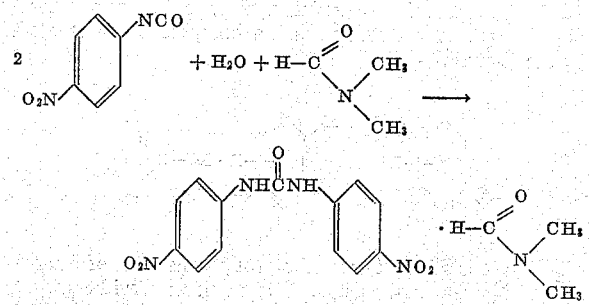

A solution of 15.3 grams of para-nitrophenylisocyanate in 70 ml. of moist dioxane was added to 248 ml. of dimethylformamide at room temperature. The resulting suspension was allowed to stand at room temperature with stirring for two hours. The insoluble 4,4′-dinitrocarbanilide·dimethylformamide complex thus formed was filtered and air dried to constant weight. The product weighed 10.7 grams.

*Example 3*

4,4′-DINITROTHIOCARBANILIDE-DIMETHYLFORMAMIDE COMPLEX

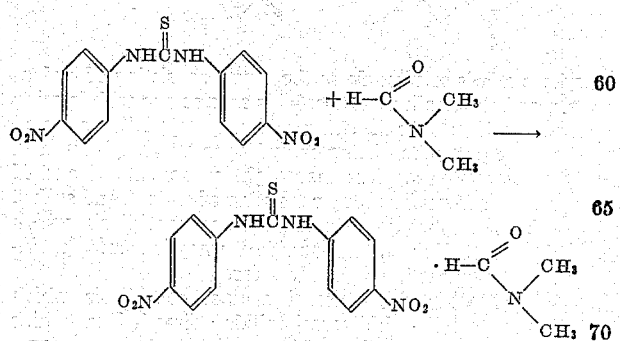

Three grams of 4,4′-dinitrothiocarbanilide was added to 45 ml. of dimethylformamide at room temperature with stirring. At the end of ninety minutes the insoluble 4,4′-dinitrothiocarbanilide·dimethylformamide complex was isolated by filtration, washed with ether and air dried.

*Example 4*

4,4′-DINITROCARBANILIDE-DIMETHYLACETAMIDE COMPLEX

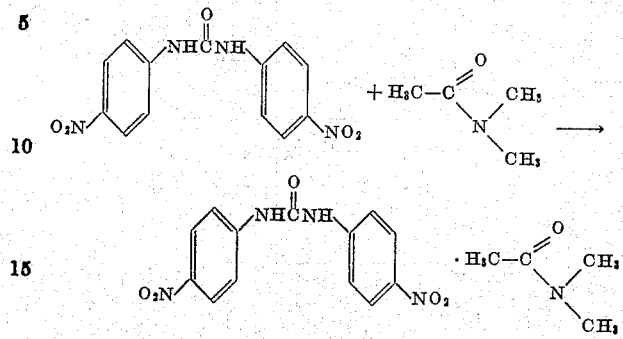

Twenty grams of 4,4′-dinitrocarbanilide was added to 100 ml. of dimethylacetamide. The mixture was stirred for one and one-half hours, during which time the solid 4,4′-dinitrocarbanilide·dimethylacetamide complex precipitated. The reaction mixture was filtered, the precipitate washed with ether and air dried to yield 24.5 grams (95.4%) of 4,4′-dinitrocarbanilide·dimethylacetamide complex having a melting point of 270°–275° C. (with decomposition in a sealed tube).

Various changes and modifications may be made in carrying out the present invention without departing from the spirit and scope thereof. Insofar as these changes and modifications are within the purview of the annexed claims, they are to be considered as part of this invention.

What is claimed is:

1. A compound of the formula—

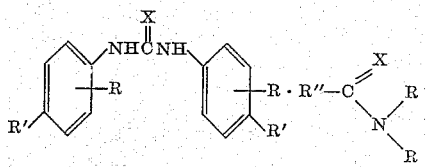

wherein R is selected from the group consisting of hydrogen and lower alkyl groups, R′ is an electron withdrawing group, R″ is selected from the group consisting of hydrogen and alkyl and aryl radicals containing less than eight carbon atoms and X is selected from the group consisting of oxygen and sulfur.

2. A compound of the formula—

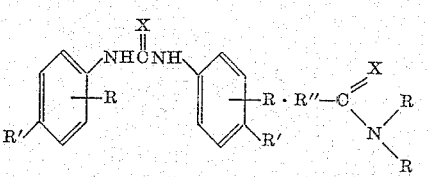

wherein R is selected from the group consisting of hydrogen and lower alkyl groups and R′ is an electron withdrawing group, at least one R′ being a nitro group, R″ is selected from the group consisting of hydrogen and alkyl and aryl radicals containing less than eight carbon atoms and X is selected from the group consisting of oxygen and sulfur.

3. A compound of the formula—

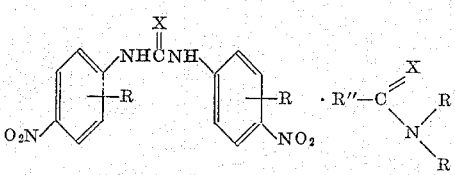

wherein R is selected from the group consisting of hydrogen and lower alkyl groups, R″ is selected from the group consisting of hydrogen and alkyl and aryl radicals containing less than eight carbon atoms and X is selected from the group consisting of oxygen and sulfur.

4. 4,4'-dinitrocarbanilide·dimethylformamide complex.
5. 4,4'-dinitrocarbanilide·formamide complex.
6. 4,4'-dinitrocarbanilide·dimethylacetamide complex.
7. The process which comprises reacting a compound represented by the formula—

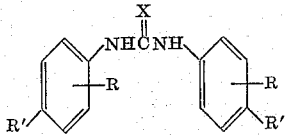

wherein R is selected from the group consisting of hydrogen and lower alkyl groups and R' is an electron withdrawing group and X is selected from the group consisting of oxygen and sulfur with a compound represented by the formula—

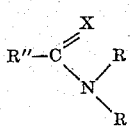

wherein R is as above and R" is selected from the group consisting of hydrogen and alkyl and aryl radicals containing less than eight carbon atoms to form a complex represented by the formula—

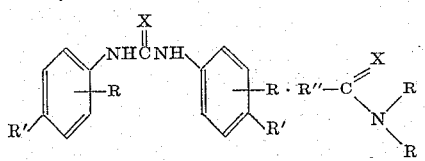

wherein R, R', R" and X are as above.

8. The process which comprises reacting a compound represented by the formula—

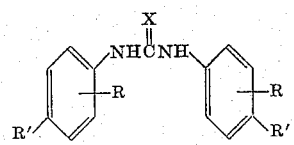

wherein R is selected from the group consisting of hydrogen and lower alkyl groups and R' is an electron withdrawing group at least one R' being a nitro group and X is selected from the group consisting of oxygen and sulfur with a compound represented by the formula—

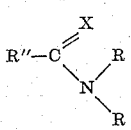

wherein R is as above and R" is selected from the group consisting of hydrogen and alkyl and aryl radicals containing less than eight carbon atoms to form a complex represented by the formula—

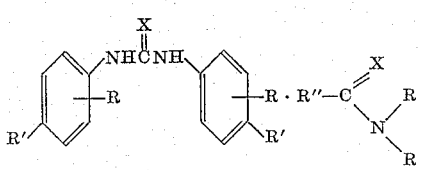

wherein R, R', R" and X are as above.

9. The process which comprises reacting a compound represented by the formula—

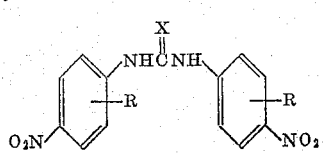

wherein R is selected from the group consisting of hydrogen and lower alkyl groups and X is selected from the group consisting of oxygen and sulfur with a compound represented by the formula—

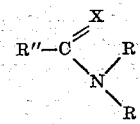

wherein R is as above and R" is selected from the group consisting of hydrogen and alkyl and aryl radicals containing less than eight carbon atoms to form a complex represented by the formula—

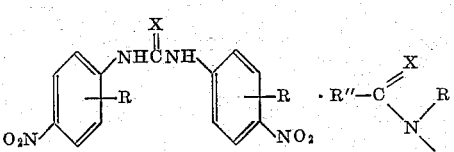

wherein R, R" and X are as above.

10. The process which comprises reacting 4,4'-dinitrocarbanilide with formamide to form 4,4'-dinitrocarbanilide·formamide complex.
11. The process which comprises reacting 4,4'-dinitrocarbanilide with dimethylformamide to form 4,4'-dinitrocarbanilide·dimethylformamide complex.
12. The process which comprises reacting 4,4'-dinitrocarbanilide with dimethylacetamide complex to form 4,4'-dinitrocarbanilide·dimethylacetamide complex.
13. A composition useful against coccidiosis which comprises an inert carrier and a compound represented by the formula—

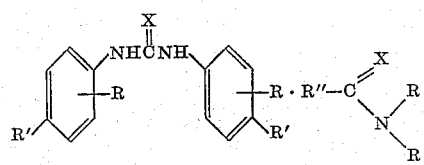

wherein R is selected from the group consisting of hydrogen and lower alkyl groups, R' is an electron withdrawing group, R" is selected from the group consisting of hydrogen and alkyl and aryl radicals containing less than eight carbon atoms and X is selected from the group consisting of oxygen and sulfur.

14. A composition useful against coccidiosis which comprises an animal feedstuff and a compound represented by the formula—

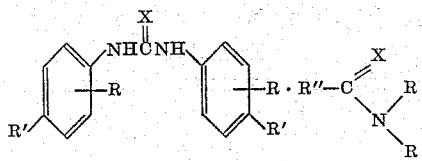

wherein R is selected from the group consisting of hydrogen and lower alkyl groups, R' is an electron withdrawing group, at least one R' being a nitro group, R" is selected from the group consisting of hydrogen and alkyl and aryl radicals containing less than eight carbon atoms and X is selected from the group consisting of oxygen and sulfur.

15. A composition useful against coccidiosis which comprises 4,4'-dinitrocarbanilide·formamide complex intimately dispersed in an inert carrier.
16. A composition useful against coccidiosis which comprises 4,4' - dinitrocarbanilide · dimethylformamide complex intimately dispersed in an inert carrier.
17. A composition useful against coccidiosis which comprises 4,4 - dinitrocarbanilide · dimethylacetamide complex intimately dispersed in an inert carrier.
18. The process which comprises reacting para-nitrophenyl isocyanate with water in the presence of a compound represented by the formula

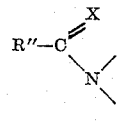

wherein R is selected from the group consisting of hydrogen and lower alkyl groups and X is selected from the group consisting of oxygen and sulfur and R″ is selected from the group consisting of hydrogen and alkyl and aryl radicals containing less than eight carbon atoms to form a complex represented by the formula

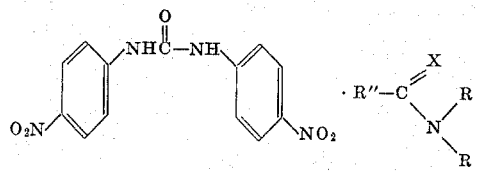

wherein R, R″ and X are as above.

No references cited.